(12) United States Patent
Bart et al.

(10) Patent No.: US 7,299,621 B2
(45) Date of Patent: Nov. 27, 2007

(54) THREE-SPOOL BY-PASS TURBOJET WITH A HIGH BY-PASS RATIO

(75) Inventors: Jacques Bart, Verrieres-le-Buisson (FR); Fabienne Lacorre, Vaux le Penil (FR); Yann Lebret, Maincy (FR); Vanessa Le Rousseau, Creteil (FR); Patrick Morel, Chartrette (FR)

(73) Assignee: Snecma Moteurs, Paris (FR)

( * ) Notice: Subject to any disclaimer, the term of this patent is extended or adjusted under 35 U.S.C. 154(b) by 481 days.

(21) Appl. No.: 11/045,365

(22) Filed: Jan. 31, 2005

(65) Prior Publication Data

US 2005/0241291 A1 Nov. 3, 2005

(30) Foreign Application Priority Data

Feb. 12, 2004 (FR) .................................. 04 01384

(51) Int. Cl.
*F02K 3/065* (2006.01)
*F02K 3/072* (2006.01)
(52) U.S. Cl. ............... 60/226.1; 60/268; 60/39.162
(58) Field of Classification Search .............. 60/226.1, 60/268, 39.162
See application file for complete search history.

(56) References Cited

U.S. PATENT DOCUMENTS 4,791,783 A 12/1988 Neitzel
4,827,712 A 5/1989 Coplin
4,860,537 A * 8/1989 Taylor .......................... 60/268
5,160,251 A 11/1992 Ciokajlo
5,388,964 A * 2/1995 Ciokajlo et al. ............ 60/226.1
5,806,303 A * 9/1998 Johnson ..................... 60/226.1
6,732,502 B2 * 5/2004 Seda et al. .................... 60/268

FOREIGN PATENT DOCUMENTS

| EP | 1 340 903 A2 | 9/2003 |
|----|--------------|--------|
| GB | 2 155 110 A  | 9/1985 |

* cited by examiner

*Primary Examiner*—Ted Kim
(74) *Attorney, Agent, or Firm*—Oblon, Spivak, McClelland, Maier & Neustadt, P.C.

(57) ABSTRACT

The invention relates to aerodynamically matching the rear fan of a turbojet having two fans and a low-pressure compressor at the front of the intermediate casing, said fans being driven by two independent shafts. Said compressor is disposed between the blades of the two fans and includes at least one ring of rotor blades around the periphery of a wheel driven by the drive shaft for the front fan, and at least two grids of stator vanes disposed on either side of the ring of rotor blades and inside a grid carrier ring. A stationary outer grid and a stator of variable pitch connect the ring to the fan casing.

6 Claims, 1 Drawing Sheet

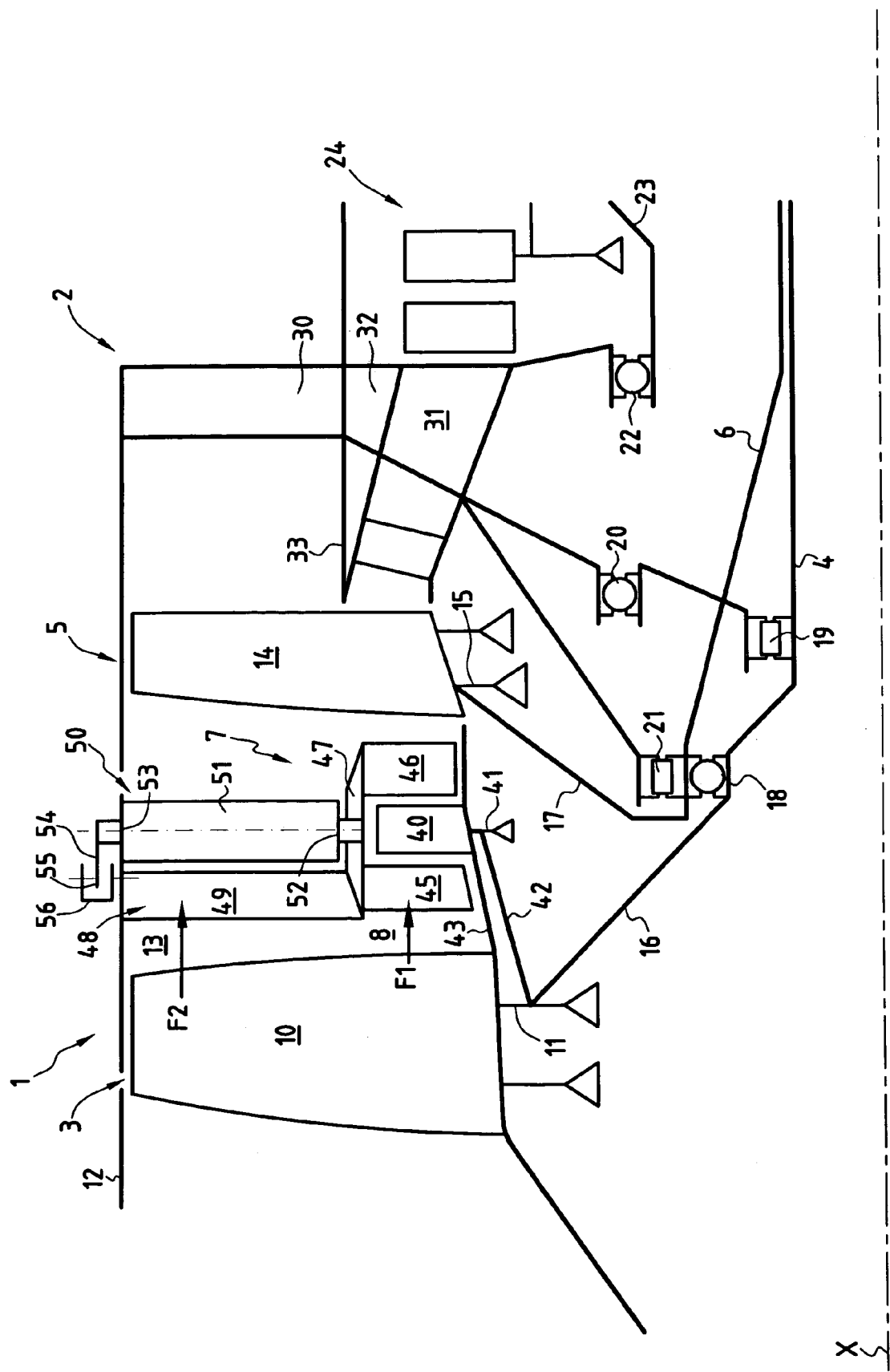

THREE-SPOOL BY-PASS TURBOJET WITH A HIGH BY-PASS RATIO

The invention relates to a three-spool by-pass turbojet with a high by-pass ratio, the turbojet having a front fan and a rear fan at the front of an intermediate casing that presents an outer structural grid in the by-pass flow and an inner structural grid in the main air flow, the fans having blades that extend radially outwards to a fan casing, which fan casing defines the outside of the by-pass air flow, the turbojet also having a low-pressure compressor for compressing the air coming into the channel for the main air flow, said front fan and said rear fan being rotated directly, and separately, by two shafts that are coaxial.

BACKGROUND OF THE INVENTION

In a modern, high-power turbojet with a high by-pass ratio, the fan has a large diameter, and the peripheral speed at the tips of the blades is proportional both to this diameter and to the speed of rotation of the fan. In order to obtain good efficiency, the peripheral speed must be lower than the speed of sound. In a conventional turbojet having a single fan, this is made possible by interposing reduction gearing between the drive shaft and the fan. Nevertheless, gearing increases the weight of the engine considerably and also reduces efficiency. Another technique consists in equipping the turbojet with two fans, a front fan and a rear fan, said fans being assembled at the front of the intermediate casing, and each fan being driven by a respective low-speed drive shaft, without any interposed reduction gearing. Each fan supplies the air flowing in the by-pass channel with substantially half the propulsion power of the by-pass air.

The state of the art is illustrated, in particular, by U.S. Pat. Nos. 3,861,139 and 4,860,537, which describe turbojets of the type referred to in the introduction, each having two counter-rotatable fans, which fans are connected to a low-pressure compressor also having counter-rotatable rotors, one of the rotors being driven by the drive shaft for the front fan and the other rotor being driven by the drive shaft for the rear fan. The fixed pitch of the blades of the two fans is determined to optimize matching of the two fans to a particular engine speed. At other speeds, however, efficiency is necessarily reduced.

OBJECTS AND SUMMARY OF THE INVENTION

The object of the invention is to make it possible to optimize matching of the rear fan to different engine speeds.

The invention achieves this object by the fact that the low-pressure compressor is disposed axially between the blades of the front fan and the blades of the rear fan, and includes at least one ring of rotor blades extending from the periphery of a wheel that is driven by the drive shaft for the front fan, and at least two grids of stator vanes disposed axially on either side of said ring of rotor blades and radially inside a grid carrier ring, said ring being supported by an outer grid that is disposed in the by-pass air flow, said outer grid being supported by the fan casing, and by the fact that a variable-pitch stator is disposed downstream from said outer grid in order to ensure that the rear fan is acceptably matched.

Moreover, the following advantageous arrangements are preferably adopted.

The outer grid has a plurality of stationary radial arms, and the variable-pitch stator has a plurality of movable radial arms that are capable of pivoting about radial axes, each movable radial arm being disposed immediately at the entry point to a stationary radial arm.

Each movable radial arm has a radially inner hinge embedded in the grid carrier ring.

Each movable radial arm has a radially outer hinge embedded in the fan casing.

The radially outer hinge is fitted with a drive arm, having a free end that is hinged to a control ring.

Very advantageously, the front fan and the rear fan are counter-rotatable fans.

BRIEF DESCRIPTION OF THE DRAWINGS

Other advantages and characteristics of the invention appear on reading the following description given by way of example, and with reference to the accompanying drawing, in which:

the sole FIGURE is a diagrammatic half-section of the front of a turbojet in accordance with the invention.

MORE DETAILED DESCRIPTION

The drawing is a diagram which shows the front 1 of a turbojet of axis X, which has a front fan 3 and a rear fan 5 at the front of an intermediate casing 2, said front fan 3 being driven by an inner drive shaft 4, said rear fan 5 being driven by an intermediate drive shaft 6 coaxial with the inner shaft 4 and surrounding said inner shaft, and a low-pressure compressor disposed axially between the front fan 3 and the rear fan 5 in order to compress the air coming into the channel 8 for the main air flow F1.

The front fan 3 has blades 10 which extend from the periphery of a wheel 11 to a fan casing 12 that defines the outside of the channel 13 for the by-pass air F2.

The rear fan likewise has blades 14 which extend from the periphery of a wheel 15 to the fan casing 12, through the channel 8 for the main air flow F1 and through the channel 13 for the by-pass air F2.

The wheel 11 of the front fan 3 is connected to the inner shaft 4 by a cone 16, and the wheel 15 of the rear fan 5 is connected to the intermediate shaft 6 by a cone 17.

An inter-shaft abutment 18 and an inter-shaft roller bearing 19 are interposed between the inner shaft 4 and the intermediate shaft 6. The intermediate shaft 6 is supported by the intermediate casing 2 by means of a thrust bearing 20 and a roller bearing 21. Reference 22 designates a thrust bearing enabling the intermediate casing 2 to support the drive shaft 23 of the high-pressure compressor 24 that is situated behind the intermediate casing 2.

The intermediate casing 2 has an outer structural grid 30 in the by-pass air flow F2 and an inner structural grid 31 in the main air flow F1. The outer structural grid 30 is connected externally to the fan casing 12. An annular box 32 is interposed between the outer structural grid 30 and the inner structural grid 32, downstream from a separating tip 33 for separating the main air flow F1 from the by-pass air flow F2. The separating tip 33 is situated upstream from the blades 14 of the rear fan 5.

The low-pressure compressor 7 is situated between the front fan 3 and the rear fan 5. Said compressor has a ring of rotor blades 40 in the main air flow F1, which blades extend from the periphery of a wheel 41 that is structurally connected to the cone 16 by an oppositely-directed cone 42 and to the platforms of the blades 10 of the front fan 3 by a shell 43, which defines the inside of the channel 8 for the main air flow F1, and two grids of stator vanes 45 and 46 that are axially disposed on either side of the ring of rotor blades 40.

The two grids of stator vanes 45 and 46 extend radially into the bore of a grid carrier ring 47, said grid carrier ring being supported by the fan casing 12 via an outer structural grid 48 having arms 49 that extend radially through the channel 13 for the by-pass air flow F2. The radially inner ends of the arms 49 are connected to the front portion of the grid carrier ring 47.

A variable-pitch stator 50 is disposed immediately downstream from the outer structural grid 48. Said stator 50 has a plurality of aerodynamically shaped movable radial arms 51, that are capable of pivoting in unison about radial axes, and that extend through the channel 13 for the by-pass air F2. The number of movable arms 51 is equal to the number of stationary arms 49 in the outer structural grid 48, and each movable arm is disposed immediately downstream from a stationary arm 49. Each movable arm 51 has a radially inner hinge 52 embedded in the grid carrier ring 47, and a radially outer hinge 53 embedded in the fan casing 12. In this particular embodiment hinges 52, 53 are pivots. The radially outer hinges 53 are fitted with drive arms 54 having free ends 55 that are hinged on a control ring 56 of axis X. Axial movement of the control ring 56 when displaced by means of actuators (not shown in the drawing), causes all of the drive arms 54 to pivot about their radial axes as defined by the hinges 52 and 53, and varies the pitch of the stator 50 as a function of flight parameters, and in particular as a function of the speed of rotation of the two fans 3 and 5 at different engine speeds.

The fact that the low pressure compressor 7 comprises a stator and a rotor that is constrained to rotate with the front fan 3 makes it possible for both fans 3 and 5 to rotate in the same direction. But the two fans 3 and 5 may also be counter-rotatable and driven by two counter-rotatable turbine rotors having respective rings of rotor blades that are axially interleaved, thereby enabling the length and the weight of the working turbine to be reduced, due to the absence of a turbine stator.

What is claimed is:

1. A three-spool by-pass turbojet with a high by-pass ratio, the turbojet having a front fan and a rear fan at the front of an intermediate casing that presents an outer structural grid in the by-pass air flow and an inner structural grid in the main air flow, the fans having blades that extend radially outwards to a fan casing, which fan casing defines the outside of the by-pass air flow, the turbojet also having a low-pressure compressor for compressing the air coming into the channel for the main air flow, said front fan and said rear fan being rotated directly, and separately, by two shafts that are coaxial, wherein the low-pressure compressor is disposed axially between the blades of the front fan and the blades of the rear fan, and includes at least one ring of rotor blades extending from the periphery of a wheel that is driven by the drive shaft for the front fan, and at least two grids of stator vanes disposed axially on either side of said ring of rotor blades and radially inside a grid carrier ring, said ring being supported by an outer grid that is disposed in the by-pass air flow, said outer grid being supported by the fan casing, and wherein a variable-pitch stator is disposed downstream from said outer grid in order to ensure that the rear fan is acceptably matched.

2. A turbojet according to claim 1, wherein the outer grid has a plurality of stationary radial arms and the variable-pitch stator has a plurality of movable radial arms, capable of pivoting about radial axes, each movable radial arm being disposed immediately behind a stationary radial arm.

3. A turbojet according to claim 2, wherein each movable radial arm has a radially inner hinge embedded in the grid carrier ring.

4. A turbojet according to claim 3, wherein each movable radial arm has a radially outer hinge embedded in the fan casing.

5. A turbojet according to claim 4, wherein the radially outer hinge is fitted with a drive arm, having a free end that is hinged to a control ring.

6. A turbojet according to claim 1, wherein the front fan and the rear fan are counter-rotatable fans.

* * * * *